(12) United States Patent
McCauley

(10) Patent No.: US 10,334,826 B2
(45) Date of Patent: Jul. 2, 2019

(54) THUMB SUPPORTED ANIMAL TRAINING LEASH

(71) Applicant: Joshua J. McCauley, Phoenix, AZ (US)

(72) Inventor: Joshua J. McCauley, Phoenix, AZ (US)

(*) Notice: Subject to any disclaimer, the term of this patent is extended or adjusted under 35 U.S.C. 154(b) by 43 days.

(21) Appl. No.: 15/331,682

(22) Filed: Oct. 21, 2016

(65) Prior Publication Data

US 2017/0035028 A1 Feb. 9, 2017

Related U.S. Application Data

(63) Continuation-in-part of application No. 29/477,551, filed on Dec. 23, 2013.

(51) Int. Cl.
*A01K 27/00* (2006.01)

(52) U.S. Cl.
CPC .......... *A01K 27/003* (2013.01); *A01K 27/005* (2013.01)

(58) Field of Classification Search
CPC ..... A01K 27/00; A01K 27/003; A01K 27/004
See application file for complete search history.

(56) References Cited

U.S. PATENT DOCUMENTS

| 6,223,694 B1* | 5/2001 | Rubin | A01K 27/003 119/795 |
| 6,276,305 B1* | 8/2001 | Pages | A01K 27/004 119/792 |
| 2015/0257369 A1* | 9/2015 | van Leeuwen | A01K 27/003 119/770 |

FOREIGN PATENT DOCUMENTS

CA 2236956 A1 * 11/1999 ............. A01K 27/00

\* cited by examiner

*Primary Examiner* — Monica L Williams
(74) *Attorney, Agent, or Firm* — Schmeiser, Olsen & Watts LLP

(57) ABSTRACT

A thumb supported leash is provided. The thumb supported leash includes a thumb tab grip having a first end and a second end, a lead portion having a first end and a second end, and a clasp. The first end of the thumb tab grip includes an aperture extending there through having a size to receive one thumb there through. The second end of the thumb tab grip is coupled to the first end of the lead portion. The second end of the lead portion is coupled to the clasp. The aperture of the thumb tab grip may receive a thumb from a hand there through and the remaining fingers of the hand may then grasp the second end of the thumb tab grip to operate the thumb supported leash.

10 Claims, 4 Drawing Sheets

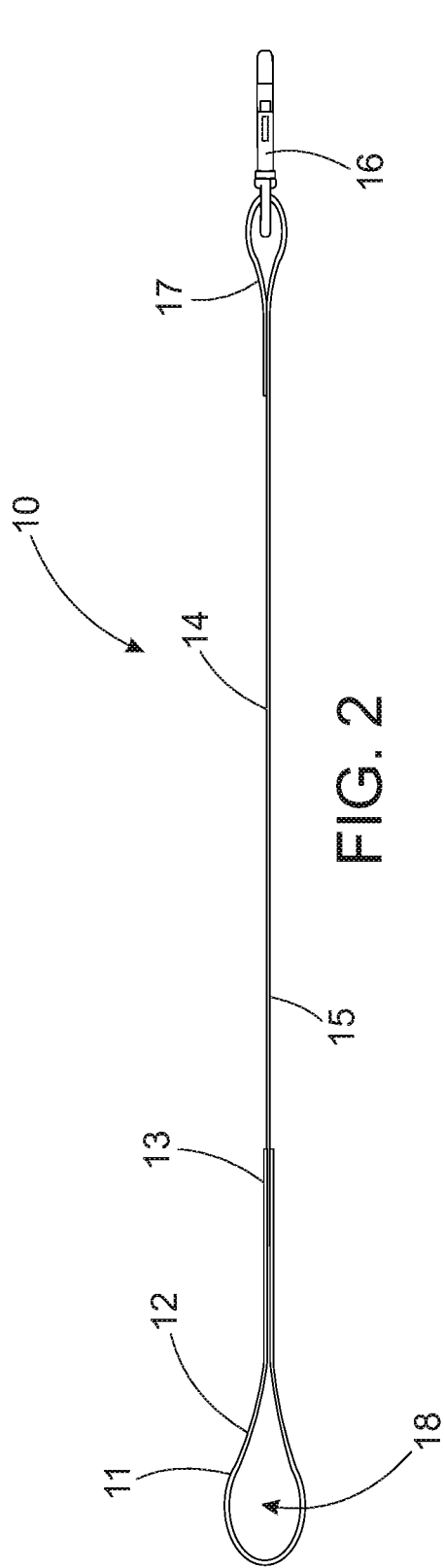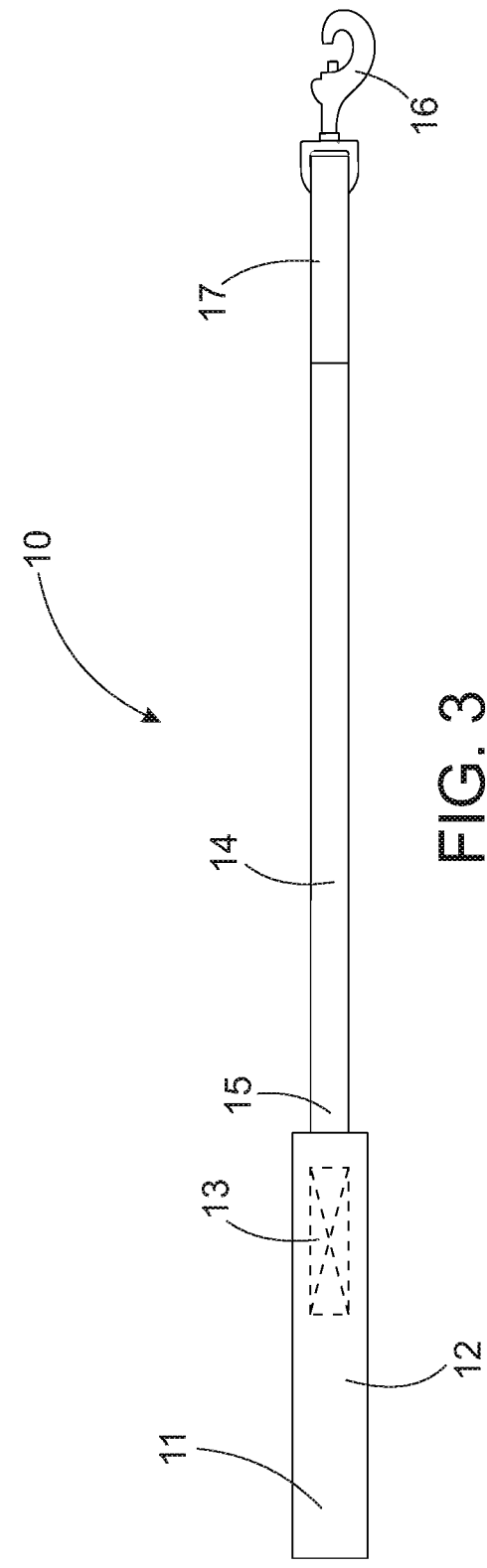

THUMB SUPPORTED ANIMAL TRAINING LEASH

CROSS REFERENCE TO RELATED APPLICATION[S]

This application is a continuation-in-part of the earlier U.S. Design Patent Application entitled "THUMB SUPPORTED SHORT TRAINING LEASH," Ser. No. 29/477,551, filed Dec. 23, 2013, the disclosure of which is hereby incorporated entirely herein by reference.

BACKGROUND OF THE INVENTION

Technical Field

This invention relates generally to an animal training leash and relates more particularly to a thumb supported animal training leash.

State of the Art

A leash is used as a means for walking animals such as dogs and cats. Leashes are often attached to collars and provide the ability to restrain or restrict the distance that the animal can move away from the person holding the leash. Generally, conventional leashes include a handle portion that is of a size and shape to hold and insert a hand within the leash. The conventional leash further includes a lead portion and a clasp, wherein the clasp engages the collar of an animal.

These conventional leashes lack in the ability of a user to control the animal and further poses a risk to harm to the users hand in an event of a struggle to restrain an animal. For example and without limitation, conventional leashes utilize a wrist loop, wherein the user inserts the entire hand or all the fingers of a hand in the wrist loop in attempts to restrain and/or control the dog while the dog is connected to the leash. With large dogs in particular, the hand or finger can be injured based on the force applied to the leash by the large dog, and further, the person utilizing the leash loses the amount of control that the leash can provide.

Accordingly, there is a need for an improved leash, and particularly a thumb supported animal training leash.

DISCLOSURE OF THE INVENTION

The present invention relates to a thumb supported animal training leash, wherein the thumb support training leash generally includes a thumb tab grip, a lead portion and clasp.

An embodiment includes a thumb supported leash comprising: a thumb tab grip having a first end and a second end; a lead portion having a first end and a second end; and a clasp, wherein: the first end of the thumb tab grip includes an aperture extending there through having a size to receive one thumb there through; the second end of the thumb tab grip is coupled to the first end of the lead portion; and the second end of the lead portion is coupled to the clasp.

Another embodiment includes a method of using a thumb supported leash, the method comprising: coupling a claps of the thumb supported leash to a collar or a harness of an animal; receiving a thumb of a hand through an aperture of a thumb tab grip of the thumb supported leash; extending a second end of the thumb tab grip across a palm of the hand; and securing the thumb tab grip in response to grasping the second end of the thumb tab grip between the remaining fingers and the palm of the hand.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 is a left side view of a thumb supported animal training leash, according to an embodiment;

FIG. 3 is a top view of a thumb supported animal training leash, according to an embodiment;

DETAILED DESCRIPTION OF EMBODIMENTS OF THE INVENTION

As discussed above, embodiments of the present invention relate to a thumb supported animal training leash, wherein the thumb support training leash generally includes a thumb tab grip, a lead portion and clasp.

Many different types of leashes are available and are used over time and often dog owners are unsure what to buy. Conventional leashes have drawbacks that originate from a large handle portion, a long lead portion, wherein the dog or the owner often trip or get tangled with in. the longer length also provide the dog, particularly large dogs and ability to generate greater force by giving more length of leash to build speed in attempts to run, thereby creating possibility of injury to arms, wrists and/or hands. Embodiments of the invention operate with a thumb tab grip and a lead portion that is shorter than conventional leashes in order to avoid these issues.

Figure 1:
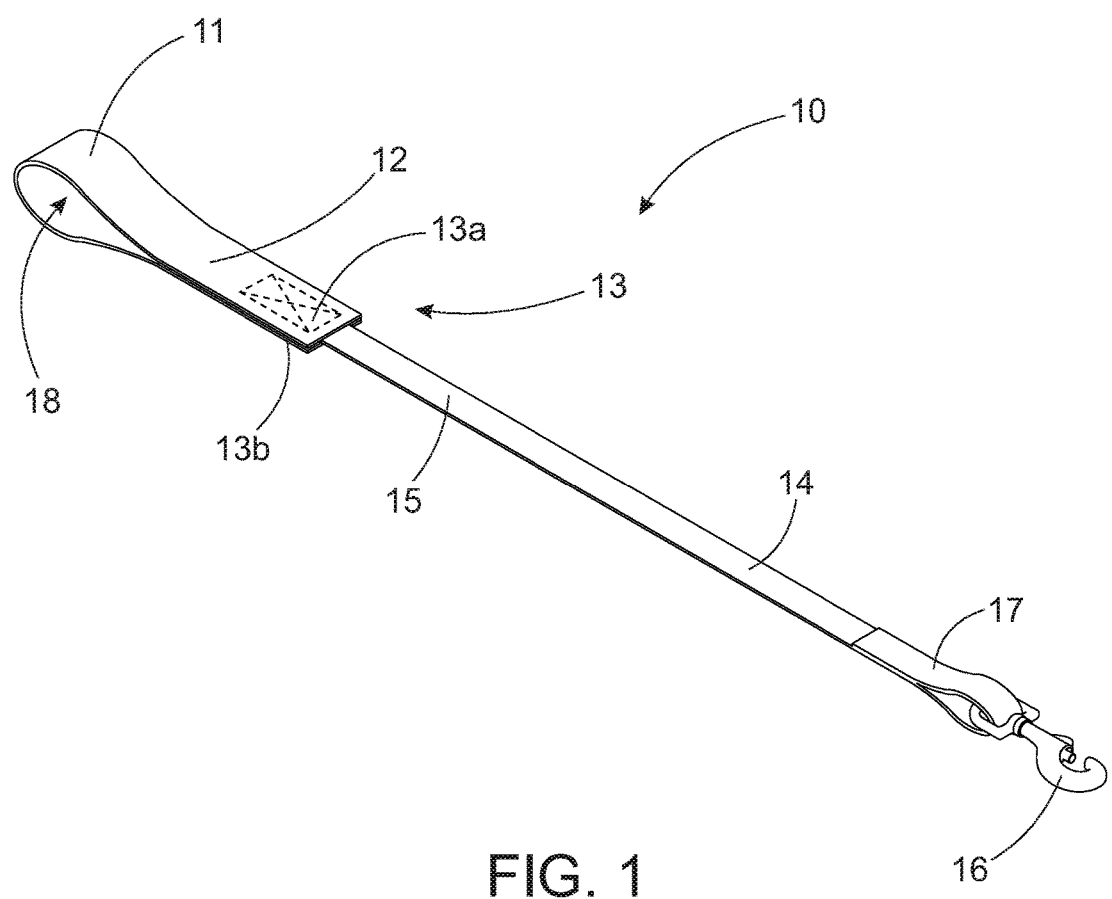
FIG. 1 is a first perspective view of a thumb supported animal training leash, according to an embodiment.

Referring to the drawings, FIGS. 1-3 depict an embodiment of a thumb supported leash 10. The thumb supported leash 10 comprises a thumb tab grip 12, a lead portion 14 and a clasp 16. The thumb tab grip 12 comprises a first end 11 and a second end 13; and the lead portion comprises a first end 15 and a second end 17. The second end 13 of the thumb tab grip 12 is coupled to the first end 15 of the lead portion. The first end 11 of the thumb tab grip 12 includes an aperture 18 extending through the thumb tab grip 12. The clap 16, while depicted as a clasp also includes any type of connector, such as a clip, a buckle, a snap and the like.

As depicted in the drawings, the thumb tab grip 12 may be formed of a single piece of material that is folded over and two ends 13a and 13b of the material form the second end 13 of the thumb tab grip 12. The two ends 13a and 13b of the thumb tab grip 12 are coupled to the first end 15 of the lead portion 14 by coupling the first end 15 of the lead portion 14 between the two ends 13a and 13b the thumb tab grip 12. The folded over material and coupling of the two ends 13a and 13b forming the second end 13 of the thumb tab grip 12 to the first end 15 of the lead portion 14 results in creating a loop or aperture 18 in the first end 11 of the thumb tab grip 12. The size of the aperture 18 allows for the insertion of one finger, typically the thumb.

The second end 17 of the lead portion 14 may be coupled to a clasp 16. The clasp 16 operates to releasably couple to a collar or a harness or the like of a dog or other animal. The length of the thumb supported leash 10 may be between 6 inches and 32 inches; may be between 6 inches and 19 inches; may be between 12 inches and 19 inches; may be approximately 18.5 inches; may be approximately 31 inches; or the like.

Figure 4:
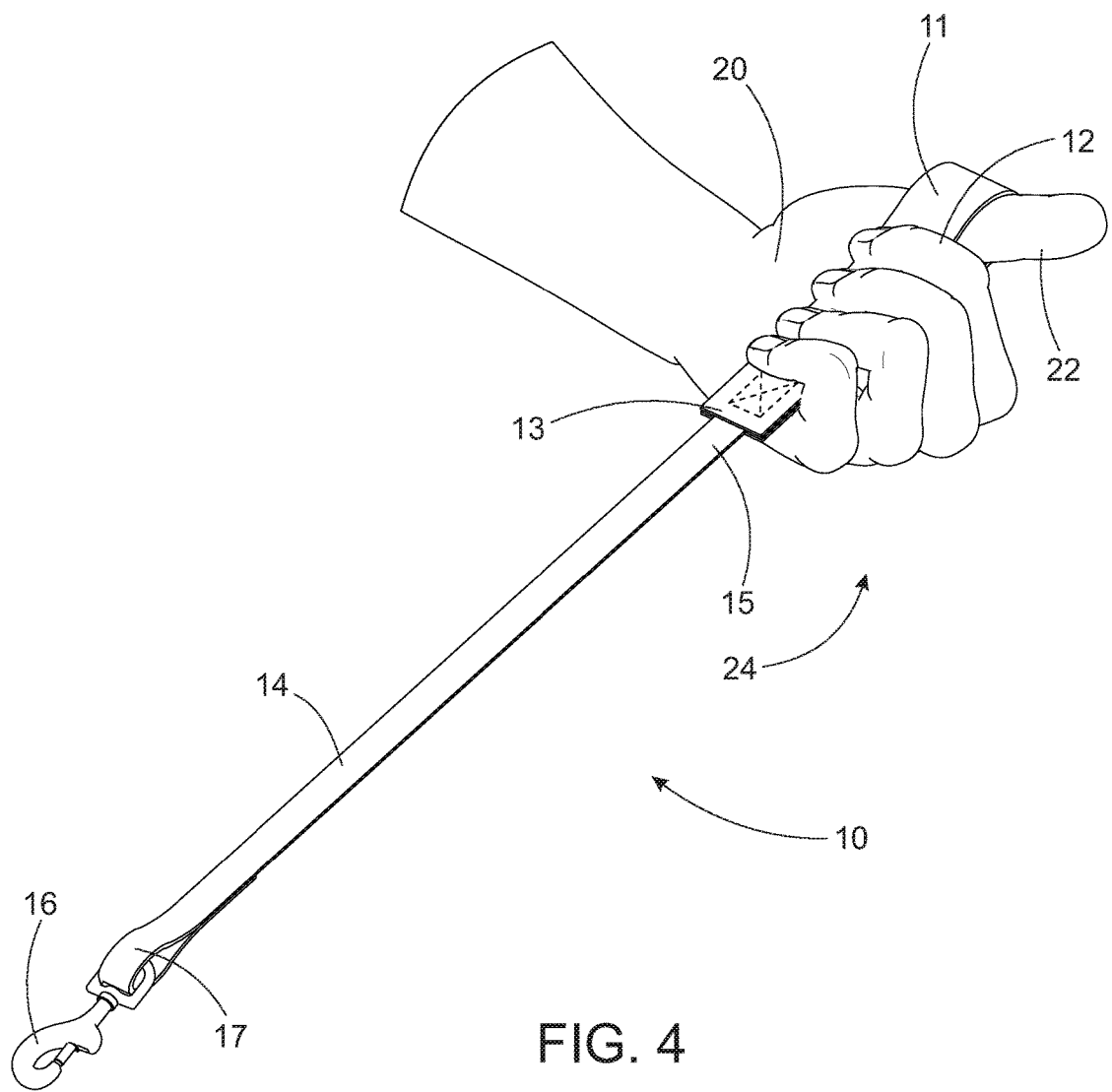
FIG. 4 is a perspective view of a thumb supported animal training leash shown in use, according to an embodiment.

In operation, and with reference to FIG. 4, the thumb tab grip 12 allows a user to consistently place his or her hand in the natural position every time he or she takes hold of the thumb supported leash 10. The thumb tab grip 12 allows the user's hand to be in its natural resting state at the user's side when operating the thumb supported leash 10. In other words, when the user walks, the user's thumb naturally rests on top of the user's hand facing the sky, the thumb supported leach allows a user to grasp the thumb tab grip 12 in this natural position. This allows the user faster response to correct the dog and provides control of the dog while minimizing the fight from the dog for control by limiting the amount of distance the dog has to generate force against the user's force.

The thumb tab grip 12 requires proper hand 20 placement to operate the leash 10. The aperture 18 of the thumb tab grip 12 receives a thumb 22 of the hand 20. The aperture 18 has a size to receive only the thumb 22 there through while the second end 13 of the thumb tab grip 12 extends across a palm of the hand 20, thereby allowing the remaining finger 24 to grasp the second end 13 of the thumb tab grip 12, as depicted in FIG. 4. With this power grip, the user can use the muscled in the thumb 22 and the flexor profundus muscle easily in the power grip which ensures an efficient grip. The power grip will ensure a better handle of the user's dog if the dog begins to pull or yank. Combining that with the shortened leash, this gives the user optimal control while teaching the dog to stay by the user's side.

While the embodiments depict the thumb supported leach 10 in with the thumb tab grip 12 and the lead portion 14 being separate elements, it will be understood that the thumb tab grip 12 and the lead portion 14 may be formed of the same piece of material to form the entire leash, with exception of the clasp 16.

Figure 5:
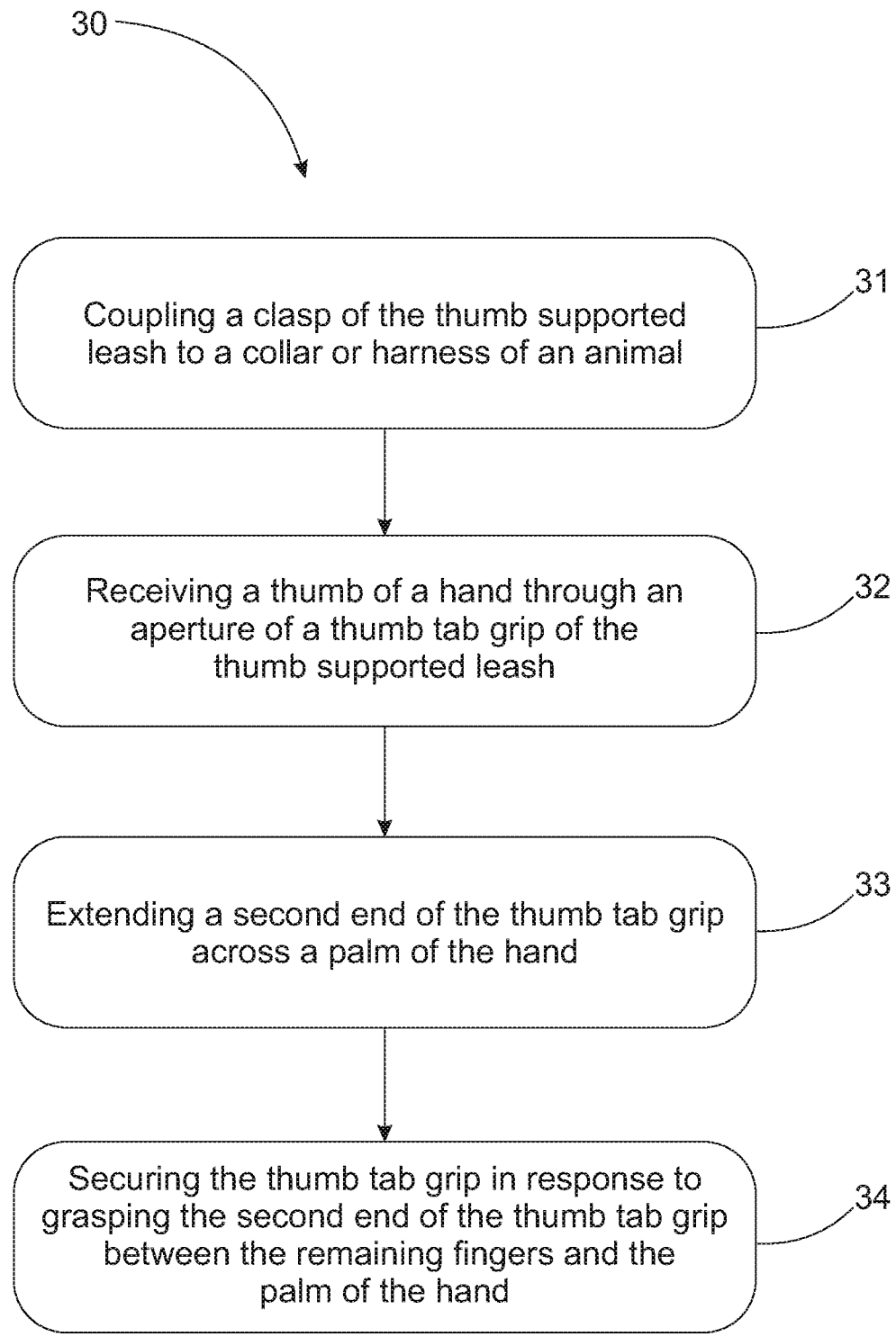
FIG. 5 is a flow chart of a method of using a thumb supported animal training leash, according to an embodiment.

As shown in FIG. 5, an embodiment of the present invention includes a method 30 of using a thumb supported leash. The method 30 includes coupling a claps of the thumb supported leash to a collar or harness of an animal (Step 31); receiving a thumb of a hand through an aperture of a thumb tab grip of the thumb supported leash (Step 32); extending a second end of the thumb tab grip across a palm of the hand (Step 33); and securing the thumb tab grip in response to grasping the second end of the thumb tab grip between the remaining fingers and the palm of the hand (Step 34).

The method may further included restraining movement of the animal in response to securing the thumb tab grip; and training the animal to stay by a side of a user in response to restraining movement of the animal. The method may also include supporting the thumb from force applied to the leash from the animal in response to grasping the second end of the thumb tab grip between the remaining fingers and the palm of the hand The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of using a thumb supported leash, the method comprising:
    coupling a clasp of the thumb supported leash to a collar or a harness of an animal, the thumb supported leash comprising:
        a thumb tab grip having a first end and a second end, the thumb tab grip is formed of a single piece of material that is folded over and coupled together to form a single aperture located at the first end between the pieces of material and the coupled portion forming the second end of the thumb tab grip;
        a lead portion having a first end and a second end; and
        a clasp, wherein:
            the aperture located at the first end of the thumb tab grip includes a size to receive one thumb there through;
            the second end of the thumb tab grip is coupled to the first end of the lead portion; and
            the second end of the lead portion is coupled to the clasp;
    receiving a thumb of a hand through the single aperture of a thumb tab grip of the thumb supported leash;
    extending a second end formed of the coupled portions of material of the thumb tab grip across a palm of the hand; and
    securing the thumb tab grip in response to grasping the second end of the thumb tab grip between the remaining fingers and the palm of the hand, wherein all material forming the thumb tab grip is around a thumb or between the remaining fingers and the palm of the hand.

2. The method of claim 1, wherein the animal is a dog or cat.

3. The method of claim 1, wherein the thumb tab grip is formed of a single piece of material that is folded over in order for two ends of the material to form a second end of the thumb tab grip.

4. The method of claim 3, wherein the two ends forming the second end of the thumb tab grip are coupled to a first end of a lead portion of the thumb supported leash by coupling the first end of the lead portion between the two ends of material forming the second end of the thumb tab grip.

5. The method of claim 4, wherein folding over the material and coupling of the two ends forming the second end of the thumb tab grip to the first end of the lead portion creates the aperture in a first end of the thumb tab grip.

6. The method of claim 5, wherein a length of the thumb supported leash is approximately 18.5 inches.

7. The method of claim 5, wherein a length of the thumb supported leash is approximately 31 inches.

8. The method of claim 1, further comprising restraining movement of the animal in response to securing the thumb tab grip.

9. The method of claim 8, further comprising training the animal to stay by a side of a user in response to restraining movement of the animal.

10. The method of claim 1, further comprising supporting the thumb from force applied to the leash from the animal in response to grasping the second end of the thumb tab grip between the remaining fingers and the palm of the hand.

* * * * *